US009268393B2

(12) United States Patent
Varma et al.

(10) Patent No.: US 9,268,393 B2
(45) Date of Patent: Feb. 23, 2016

(54) ENFORCING A POWER CONSUMPTION DUTY CYCLE IN A PROCESSOR

(71) Applicant: Intel Corporation, Santa Clara, CA (US)

(72) Inventors: Ankush Varma, Hillsboro, OR (US); Krishnakanth Sistla, Beaverton, OR (US); Martin T. Rowland, Beaverton, OR (US); Brian J. Griffith, Auburn, WA (US); Viktor D. Vogman, Olympia, WA (US); Joseph R. Doucette, Waltham, MA (US); Eric J. Dehaemer, Shrewsbury, MA (US); Vivek Garg, Folsom, CA (US); Chris Poirier, Fort Collins, CO (US); Jeremy J. Shrall, Portland, OR (US); Avinash N. Ananthakrishnan, Hillsboro, OR (US); Stephen H. Gunther, Beaverton, OR (US)

(73) Assignee: Intel Corporation, Santa Clara, CA (US)

(*) Notice: Subject to any disclaimer, the term of this patent is extended or adjusted under 35 U.S.C. 154(b) by 245 days.

(21) Appl. No.: 13/997,295

(22) PCT Filed: Nov. 30, 2012

(86) PCT No.: PCT/US2012/067202
§ 371 (c)(1),
(2) Date: Jun. 24, 2013

(87) PCT Pub. No.: WO2014/084842
PCT Pub. Date: Jun. 5, 2014

(65) Prior Publication Data
US 2014/0157021 A1    Jun. 5, 2014

(51) Int. Cl.
*G06F 1/26* (2006.01)
*G06F 1/32* (2006.01)
*G06F 1/06* (2006.01)
*G06F 9/45* (2006.01)

(52) U.S. Cl.
CPC .............. *G06F 1/3234* (2013.01); *G06F 1/324* (2013.01); *G06F 1/06* (2013.01); *G06F 8/4432* (2013.01); *Y02B 60/1217* (2013.01)

(58) Field of Classification Search
CPC ........ G06F 1/3234; G06F 1/06; G06F 8/4432
See application file for complete search history.

(56) References Cited

U.S. PATENT DOCUMENTS

| 6,367,023 B2 | 4/2002 | Kling et al. |
| 7,409,315 B2 | 8/2008 | Kim et al. |
| 7,949,493 B2 | 5/2011 | Vorenkamp et al. |

(Continued)

OTHER PUBLICATIONS

PCT International Search Report and Written Opinion issued in corresponding PCT/US2012/067202 dated Aug. 21, 2013 (12 pages).

*Primary Examiner* — Jaweed A Abbaszadeh
*Assistant Examiner* — Xuxing Chen
(74) *Attorney, Agent, or Firm* — Trop, Pruner & Hu, P.C.

(57) ABSTRACT

In an embodiment, a processor includes a plurality of cores each to independently execute instructions, a plurality of graphics engines each to independently perform graphics operations; and, a power control unit coupled to the plurality of cores to control power consumption of the processor, where the power control unit includes a power excursion control logic to limit a power consumption level of the processor from being above a defined power limit for more than a duty cycle portion of an operating period. Other embodiments are described and claimed.

19 Claims, 7 Drawing Sheets

(56) References Cited

U.S. PATENT DOCUMENTS

| | | | |
|---|---|---|---|
| 8,924,752 B1* | 12/2014 | Law et al. | 713/322 |
| 2004/0225821 A1 | 11/2004 | Klein et al. | |
| 2005/0022043 A1* | 1/2005 | Yamaji et al. | 713/340 |
| 2007/0050646 A1* | 3/2007 | Conroy et al. | 713/300 |
| 2008/0136400 A1 | 6/2008 | Chi et al. | |
| 2013/0124885 A1* | 5/2013 | Davis et al. | 713/320 |

* cited by examiner

ENFORCING A POWER CONSUMPTION DUTY CYCLE IN A PROCESSOR

BACKGROUND

Advances in semiconductor processing and logic design have permitted an increase in the amount of logic that may be present on integrated circuit devices. As a result, computer system configurations have evolved from a single or multiple integrated circuits in a system to multiple hardware threads, multiple cores, multiple devices, and/or complete systems on individual integrated circuits. Additionally, as the density of integrated circuits has grown, the power requirements for computing systems (from embedded systems to servers) have also escalated. Furthermore, software inefficiencies, and its requirements of hardware, have also caused an increase in computing device energy consumption. In fact, some studies indicate that computing devices consume a sizeable percentage of the entire electricity supply for a country, such as the United States of America. As a result, there is a vital need for energy efficiency and conservation associated with integrated circuits. These needs will increase as servers, desktop computers, notebooks, Ultrabooks™, tablets, mobile phones, processors, embedded systems, etc. become even more prevalent (from inclusion in the typical computer, automobiles, and televisions to biotechnology).

Power management for integrated circuits such as processors (used in both server and client systems) is based on estimates of current processor power consumption. Various components of a processor may have their voltage and frequency modulated to stay within specified power limits. This is so, as power supply units (PSUs) in computer platforms have very specific limits on the peak power they can deliver. These PSUs typically have a thermally sustainable power level which can be sustained indefinitely/continuously, and a higher electrically sustainable power level which can only be sustained for specific durations and duty cycles. The average power delivered by the power supply over thermally significant time periods cannot exceed the thermally sustainable level. Oversizing a power supply to account for worst case scenarios increases size, cost and efficiency, while undersizing a power supply can lead to catastrophic results.

DETAILED DESCRIPTION

In various embodiments, a processor-based mechanism is provided to enforce constraints on power consumption of the processor in a guaranteed manner in order to allow appropriately sized peak-rated power supplies to be used for supplying power. To this end, embodiments enforce such constraints while power consumption and dynamic range of the processor extend close to, but are guaranteed not to exceed design limits of the power supply.

As such, a processor is configured with a defined power limit at which it seeks to be regulated. A worst-case power excursion above this power limit is prevented from having a magnitude higher than a defined maximum power level, $P_{max}$. Also, this worst-case power excursion above the power limit is prevented from having a time at peak longer than a worst case duration, T1. Also, no power excursion above the defined power limit can have a duration longer than a duration of T2. And, any excursion above the power limit is restricted to a duty cycle (time_above_limit/total_time) of no higher than d %. By operating a processor with the above constraints, a peak-rated power supply can operate at close to its design limit without unnecessary guard bands (extra cost), or chance of electrical failure if the design limit is violated (extra risk).

Although the scope of the present invention is not limited in this regard, duty cycle control as described herein can be implemented via firmware, hardware, software, and combinations thereof, to thus enforce a fixed duty cycle and maximum duration for all excursions above a defined power limit.

Figure 1:
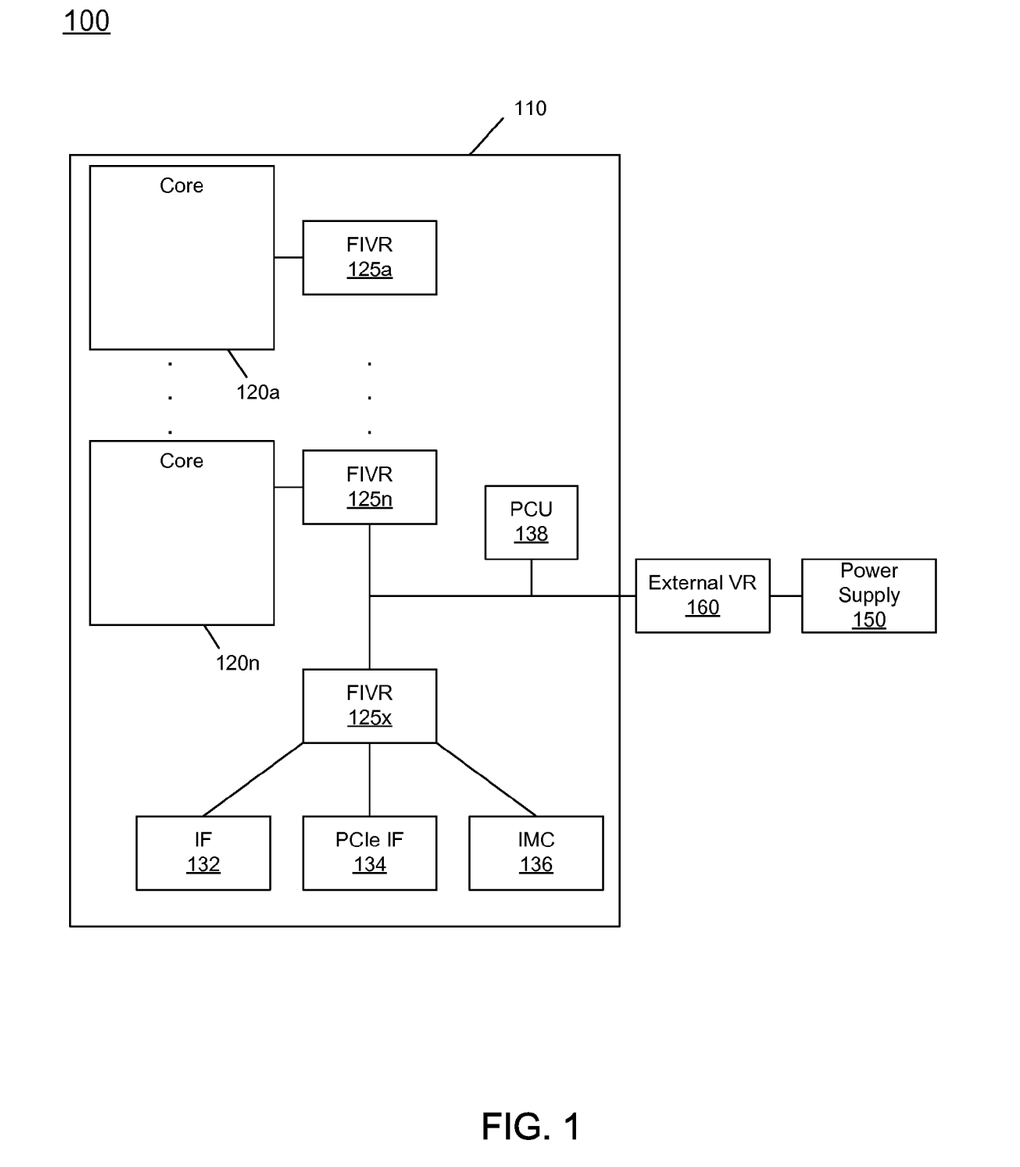
FIG. 1 is a block diagram of a system in accordance with one embodiment of the present invention.

Referring now to FIG. 1, shown is a block diagram of a portion of a system in accordance with an embodiment of the present invention. As shown in FIG. 1, system 100 may include various components, including a processor 110 which as shown is a multicore processor. Processor 110 may be coupled to a power supply 150 via an external voltage regulator 160, which may perform a first voltage conversion to provide a primary regulated voltage to processor 110.

As seen, processor 110 may be a single die processor including multiple cores $120_a$-$120_n$. In addition, each core may be associated with an individual voltage regulator $125_a$-$125_n$. Accordingly, a fully integrated voltage regulator (FIVR) implementation may be provided to allow for fine-grained control of voltage and thus power and performance of each individual core. As such, each core can operate at an independent voltage and frequency, enabling great flexibility and affording wide opportunities for balancing power consumption with performance.

Still referring to FIG. 1, additional components may be present within the processor including an input/output interface 132, another interface 134, and an integrated memory controller 136. As seen, each of these components may be powered by another integrated voltage regulator $125_x$. In one embodiment, interface 132 may be in accordance with the Intel® Quick Path Interconnect (QPI) protocol, which provides for point-to-point (PtP) links in a cache coherent protocol that includes multiple layers including a physical layer, a link layer and a protocol layer. In turn, interface 134 may be in accordance with a Peripheral Component Interconnect Express (PCIe™) specification, e.g., the PCI Express™ Specification Base Specification version 2.0 (published Jan. 17, 2007).

Also shown is a power control unit (PCU) 138, which may include hardware, software and/or firmware to perform power management operations with regard to processor 110. In various embodiments, PCU 138 may include logic to perform duty cycle control to limit excursions above a defined power limit to a portion of operating cycles and for a limited time duration in accordance with an embodiment of the present invention. Furthermore, PCU 138 may be coupled via a dedicated interface to external voltage regulator 160. In this way, PCU 138 can instruct the voltage regulator to provide a requested regulated voltage to the processor. In addition, voltage regulator 160 can provide information regarding its current delivery to the processor. In different implementations, voltage regulator 160 can store this information in a register of the voltage regulator that the PCU accesses. Or a current sensor, located either in voltage regulator 160 or on the path between voltage regulator 160 and PCU 138 can provide this information. This current information and corresponding power consumption determination, e.g., via a power detector of the PCU can be used by a duty cycle controller such as a power excursion logic of PCU 138 to limit excursions above a defined power consumption level based on power consumption of the processor. Thus a voltage regulator-based current sensor can directly measure the current supplied by voltage regulator 160 to the processor. When multiplied by the supply voltage, this provides a measurement of processor power consumption.

While not shown for ease of illustration, understand that additional components may be present within processor 100 such as uncore logic, and other components such as internal memories, e.g., one or more levels of a cache memory hierarchy and so forth. Furthermore, while shown in the implementation of FIG. 1 with an integrated voltage regulator, embodiments are not so limited.

Although the following embodiments are described with reference to energy conservation and energy efficiency in specific integrated circuits, such as in computing platforms or processors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to any particular type of computer systems, and may be also used in other devices, such as handheld devices, systems on chip (SoCs), and embedded applications. Some examples of handheld devices include cellular phones, Internet protocol devices, digital cameras, personal digital assistants (PDAs), and handheld PCs. Embedded applications typically include a microcontroller, a digital signal processor (DSP), network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future, such as for power conservation and energy efficiency in products that encompass a large portion of the US economy.

Note that the power control described herein may be independent of and complementary to an operating system (OS)-based mechanism, such as the Advanced Configuration and Platform Interface (ACPI) standard (e.g., Rev. 3.0b, published Oct. 10, 2006). According to ACPI, a processor can operate at various performance states or levels, namely from P0 to PN. In general, the P1 performance state may correspond to the highest guaranteed performance state that can be requested by an OS. In addition to this P1 state, the OS can further request a higher performance state, namely a P0 state. This P0 state may thus be an opportunistic state in which, when power and/or thermal budget is available, processor hardware can configure the processor or at least portions thereof to operate at a higher than guaranteed frequency. In many implementations a processor can include multiple so-called bin frequencies above a guaranteed maximum frequency, also referred to as a P1 frequency. By controlling certain processor parameters as described herein, an OS-requested performance level may not be allowed to occur to enforce power delivery system constraints.

As one example of duty cycle control that can be performed, a dynamic frequency limit can be maintained, which is the maximum operating frequency at which the processor is allowed to run at a given point in time. Various power/performance management algorithms may request performance levels at frequencies up to this limit, but not higher. During each evaluation interval (Tp), processor power consumption can be measured to determine if it is above the defined power limit. In different embodiments, this measurement can be through a direct measurement from a voltage regulator, or a built-in power estimator in the processor. If the power P is above the defined power limit PL (P>PL), then the frequency limit can be reduced, e.g., by one step. This is the new frequency limit, and which is maintained for a minimum hold time, $T_{min\_hold}$. Since processor power is a strong function of processor frequency, this reduces power consumption. In an embodiment, $T_{min\_hold}$ can be derived from the desired duty cycle by duty_cycle=$Tp/(Tp+T_{min\_hold})$. If, within the hold time, power still exceeds the defined limit (P>PL), the frequency limit can be reduced again, e.g., by another step, and the hold time may be increased by Tmin_hold again.

Given the worst-case power excursion possible ($P_{max}$), it is possible to calculate the number of frequency steps to reduce the power down to the limit (PL), resulting in a worst-case excursion duration of $T_{max\_excursion}$=max_num_steps*Tp.

In some embodiments, a so-called "N-th strike" behavior can be implemented. That is, the maximum duration of an excursion depends on the size of the excursion (Pmax−PL), the size of each frequency step and Tp. It is possible to bound this duration to a maximum of N*Tp by reducing power consumption to a known power state that is guaranteed to be lower than PL on the N-th frequency step, where N is a predetermined constant.

A different power control mechanism that may be implemented in some embodiments is by control of an electrical design point (EDP) budget. This budget is tracked to ensure that an electrically unsafe condition cannot be created. This budget tracks the worst-case current that can be consumed given the frequency or state of various on-die modules, to ensure that it does not exceed a given instantaneous current limit. Instead of reducing a frequency limit, the EDP budget can be reduced (e.g., by step values or to a predetermined level), rather than reducing the frequency limit, since different domains of the processor may operate at different frequencies.

Figure 2:
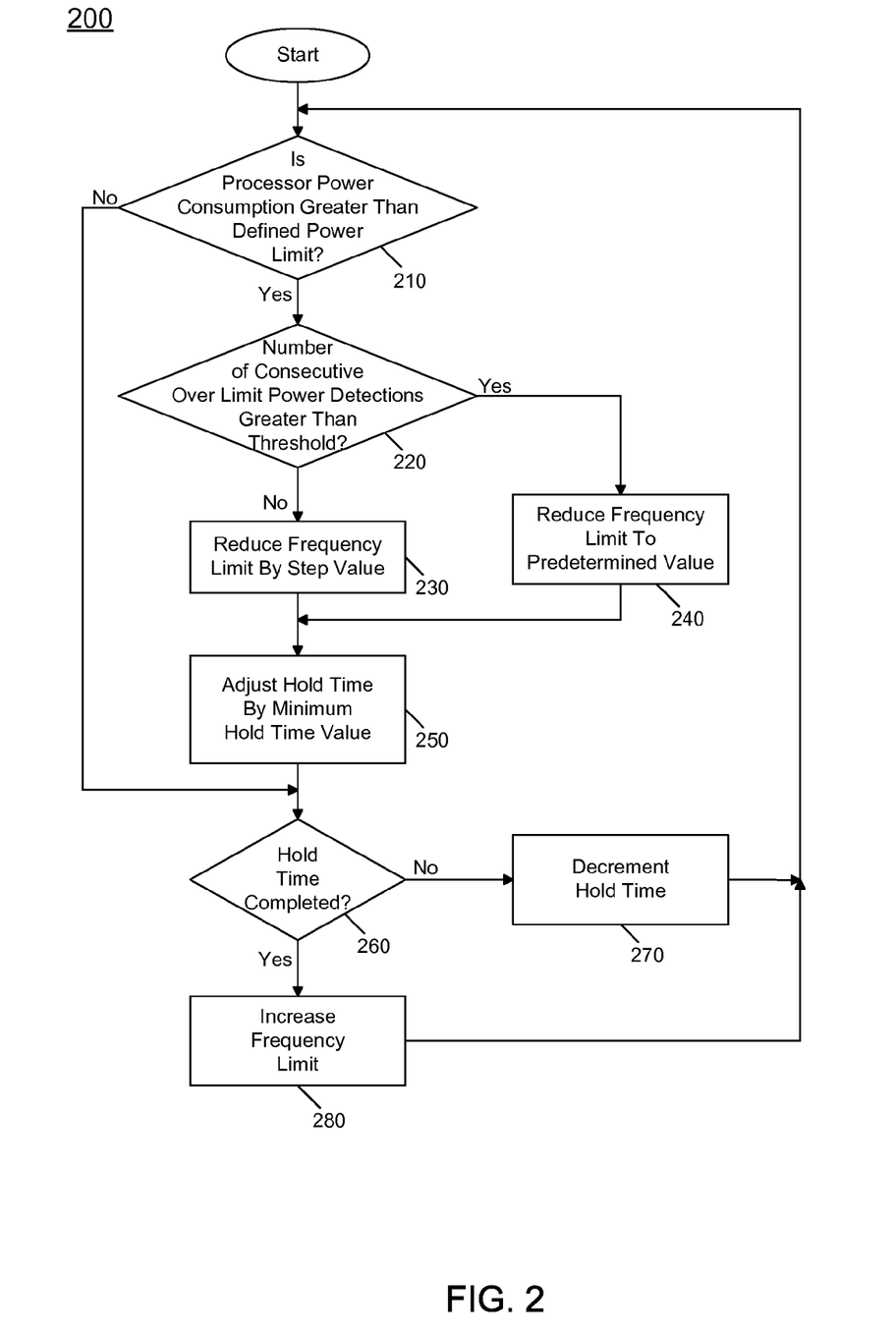
FIG. 2 is a flow diagram of a method in accordance with an embodiment of the present invention.

Referring now to FIG. 2, shown is a flow diagram of a method in accordance with an embodiment of the present invention. As shown in FIG. 2, method 200 can be implemented by logic of a PCU. More specifically, method 200 can be implemented by power excursion control logic of a PCU that can receive and process information regarding instantaneous power consumption of the processor. As seen, method 200 begins by determining whether a power consumption level of a processor is greater than a defined power limit (diamond 210). Note that this determination may be made on a regular basis, e.g., as part of a regular execution of power control logic of the PCU during an evaluation interval, such as so-called P-code or firmware that executes within the PCU or other portion of the processor. This regular period may be on the order on approximately every millisecond (ms). This defined power limit, which may be stored in a configuration register, can be fixed, e.g., on system manufacture by an original equipment manufacturer (OEM). Or the defined power limit can be user-controlled to allow a user to establish a power level above which power excursions can be limited.

Still referring to FIG. 2, next at diamond 220 it can be determined whether a number of consecutive over the limit power detections is greater than a threshold number. That is, if multiple iterations indicate an over the limit situation, this means that the current power consumption level of the processor is too high and is not decreasing at a sufficiently fast rate. Accordingly, control passes to block 240 where a frequency limit of the processor can be reduced to a predetermined value. In an embodiment this predetermined value may correspond to a level that ensures that the power consumption of the processor falls below the defined power limit. Otherwise, if at diamond 220 the determination is negative in that the number of over the limit power detections is less than this threshold, control passes to block 230 where the frequency limit can be reduced by a step value. As an example this step value may correspond to a bin frequency which in a particular implementation may correspond to a reference clock frequency, e.g., 100 megahertz (MHz).

Note that in either case, the reduction in the frequency limit will in turn cause a decrease in an operating frequency of at least portions of a processor. For example, a core domain and a graphics domain of the processor may have their operating frequencies reduced responsive to this reduction in the frequency limit. In some implementations this change may be effected immediately upon updating of the frequency limit. In other implementations, this adjustment to the operating frequency may instead occur during a regular analysis of operating frequency, e.g., as part of the P-code.

Still referring to FIG. 2, control from both blocks 230 and 240 then passes to block 250 where a hold time may be adjusted by a minimum hold time value. This hold time corresponds to a duration at which a current power consumption level (and namely here a reduced power consumption level) is to be maintained before allowing an increase in power consumption. As such, this hold time in part enables maintenance of a given duty cycle, in that power consumption of a processor is allowed to be above the defined power limit for only a portion of an entire operating period. Although the scope of the present invention is not limited in this regard this defined power limit may vary depending on type of processor, e.g., on the order of approximately 100's of milliwatts for embedded processors to 200 watts for server processors, in some embodiments.

Next, control passes to diamond 260 where it can be determined whether the hold time is completed. If not, the hold time may be decremented at block 270. For example, the hold time can be decremented by a length of the evaluation interval of method 200, e.g., 1 ms. Otherwise if it is determined that the hold time is completed such that a potential increase in power consumption may again be effected, control passes to block 280 where the frequency limit may be increased. Although the scope of the present invention is not limited in this regard in an embodiment this increase may be by the step value. Note that this increase in frequency limit may not necessarily cause a corresponding increase in operating frequency of one or more processor domains, in that if system software is not requesting a higher frequency, a current operating frequency level can be maintained. Although shown at this high level in the embodiment of FIG. 2, understand the scope of the present invention is not limited in this regard.

Figure 3:
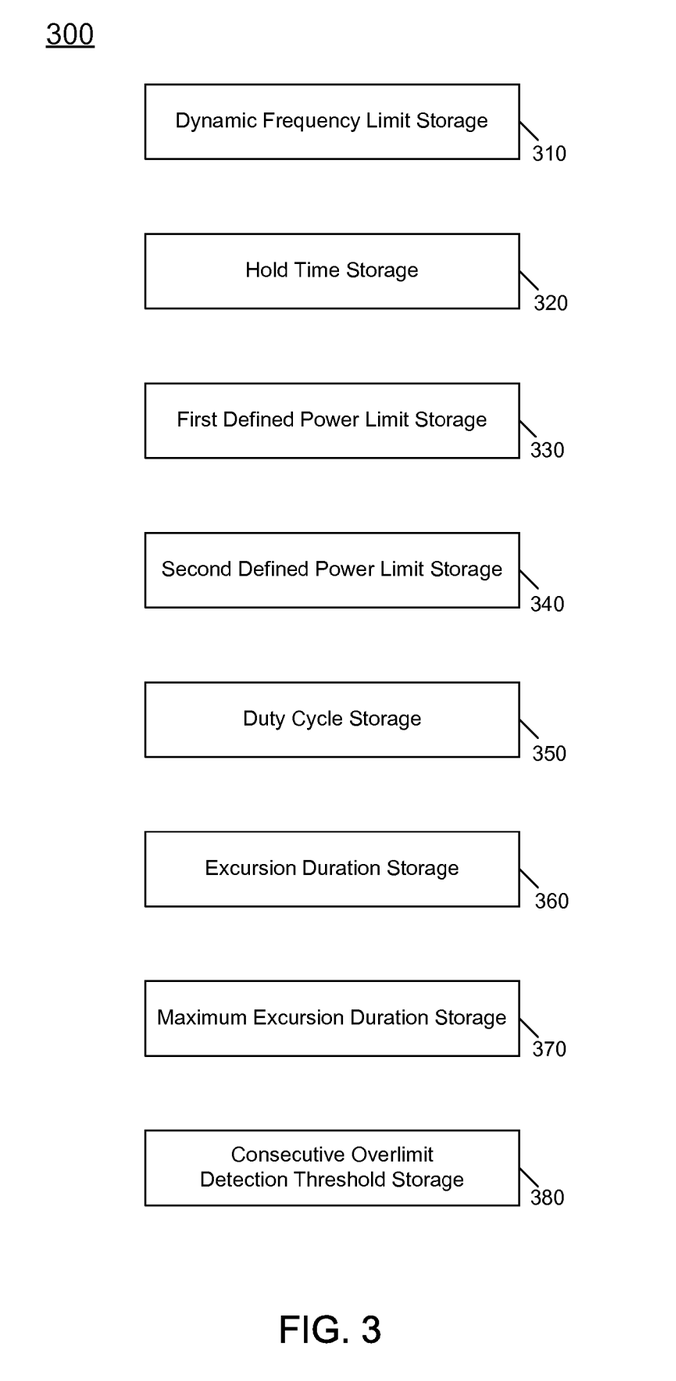
FIG. 3 is a block diagram of a storage used to store various configuration and other values for duty cycle control in accordance with an embodiment of the present invention.

As discussed above, various information is used in determining the presence of power excursions and controlling them accordingly. Referring now to FIG. 3, shown is a block diagram of a storage used to store various configuration and other values used in such operations. As seen in FIG. 3, storage 300 may be a set of registers or other storage mechanisms within a processor. As an example, storage 300 may be at least a portion of a configuration and status storage within a power control unit of a processor. As such, the various elements shown in FIG. 3 each may correspond to a register to store one or more values. Instead of registers, another type of storage may be present such as a memory including a plurality of entries, e.g., a cache memory such as a static random access memory (SRAM) or other types of memory.

As seen, storage 300 includes a first storage 310 to store a dynamic frequency limit. This dynamic limit thus may be set by the PCU during execution of method 200 to thus cause the frequency limit to be at a particular value. The PCU may thereafter access this value during performance/power management operations to determine whether to allow a requested performance level to occur. For example, assume a software request is made for a so-called P0 performance level (which assume occurs at a frequency limit of 3.5 gigahertz (GHz)). If storage 310 includes a frequency limit of 3.0 GHz, a change to this P0 performance level is not effected and processor performance is limited to that available with an operating frequency of 3.0 GHz.

Storage 300 further includes a hold time storage 320 which may be accessed and updated during execution of method 200 to determine whether a power reduction is to be maintained. Next, storage 300 further includes a first defined power limit storage 330 and a second defined power limit storage 340. These values may be as discussed above, namely configuration values to store short term and long term power limits, respectively. Duty cycle storage 350 may be used to store a duty cycle, which in an embodiment may be a configuration value to thus identify a limit, e.g., corresponding to a percentage of total operating time for which processor operation may exceed a defined power limit (e.g., the first defined power limit).

Still referring to FIG. 3, storage 300 also includes an excursion duration storage 360 and a maximum excursion duration storage 370. These storages may store configuration values, namely an excursion duration which is an amount of time that power consumption is allowed to be above the defined power limit, and a maximum excursion duration which corresponds to an amount of time that power consumption is allowed to be at a worst case excursion above the power limit. (Note this duration is set at a lower duration than the excursion duration). Finally, storage 300 includes consecutive over limit detection threshold storage 380 which may store a configuration value corresponding to a threshold number of consecutive over limit detections allowed. If this threshold (e.g., n=5) is reached, meaning that five consecutive power consumption readings are above the defined power limit, an immediate reduction in frequency limit to a frequency to guarantee that power consumption is below the defined power limit may be effected. Although shown with these particular storage elements within storage 300, understand the scope of the present invention is not limited in this regard and many other pieces of information may be included in these and other storages within the PCU or other storage of a processor.

Figure 4:
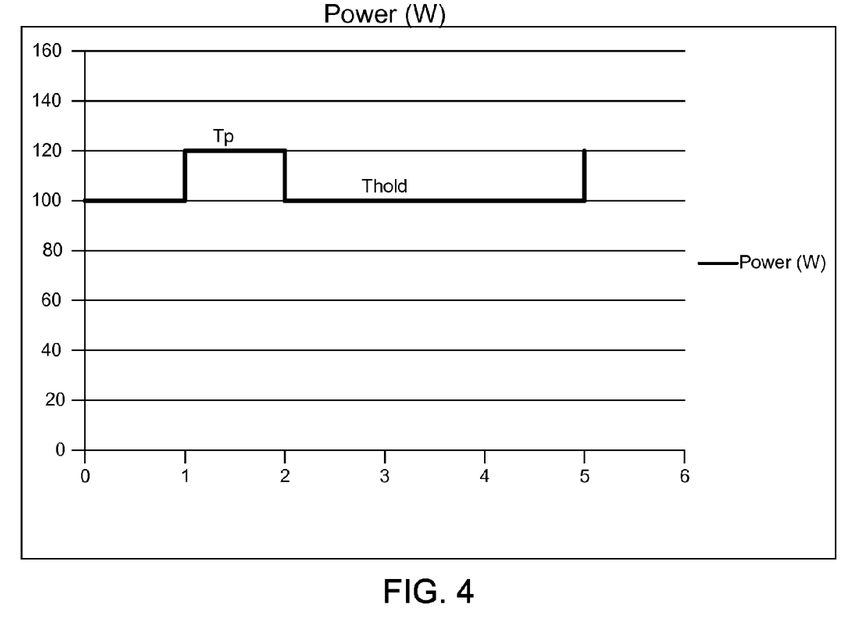
FIG. 4 is a graphical illustration of a duty cycle enforcement technique in accordance with an embodiment of the present invention.

Referring now to FIG. 4, shown is a graphical illustration of a duty cycle enforcement technique in accordance with an embodiment of the present invention. As shown in FIG. 4, assume that a processor is configured to have a defined power limit of 100 watts (W). Also in this example assume that an evaluation interval ($T_p$) corresponds to 1 ms, a minimum hold time ($T_{min\_hold}$) is 3 milliseconds and a duty cycle is set at 25%. As seen in FIG. 4, power consumption of the processor begins to exceed its defined power limit, rising to a level of 120 W. While this power consumption level exceeds the defined power limit further assume that this level does not exceed a higher, worst case power limit. As such, during an evaluation interval occurring after this increase in power consumption, a detection of an over the limit situation occurs. Thus a frequency limit may be reduced and furthermore a hold time can be set. A result, the reduction in frequency limit causes a reduction in power consumption level, bringing the power consumption level towards the defined power limit.

Furthermore because a hold time is set, e.g., to the minimum hold time, note that no greater power consumption occurs until this hold time is completed. Then at this point, the frequency limit may again be increased, leading to another rise in power consumption. Assuming that the pattern shown in FIG. 4 continues during operation, the configured duty cycle, e.g., of 25%, is maintained such that power consumption of the processor does not exceed the defined power level for more than this duty cycle amount. In this way, the duty cycle is enforced and a guarantee exists that power supply constraints are enforced. Of course understand that in different manners of controlling a hold time are possible, and it is further possible to provide for more than two power limits and also to provide for various power control mechanisms other than reducing operating frequency.

Figure 5:
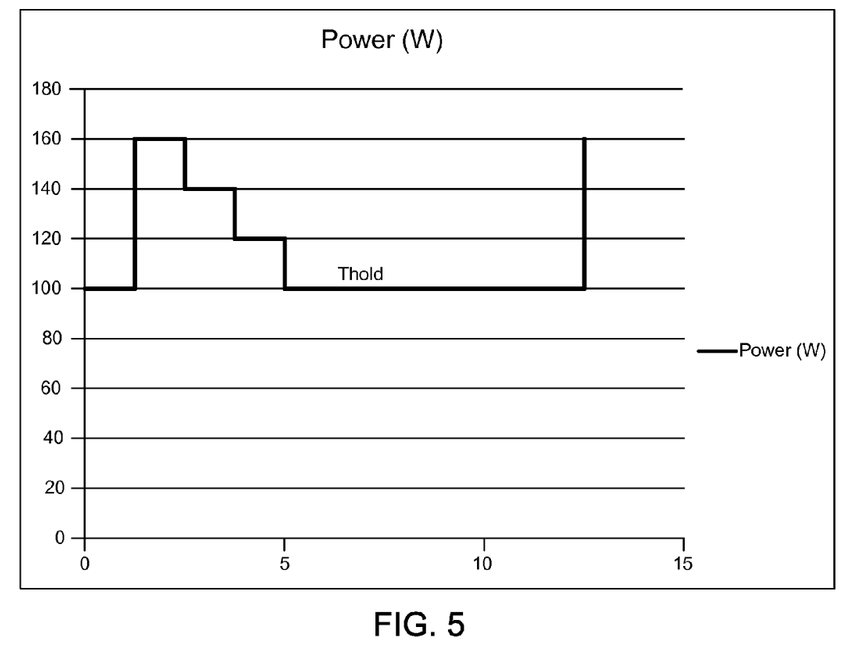
FIG. 5 is another graphical illustration of a duty cycle enforcement technique in accordance with an embodiment of the present invention.

Referring now to FIG. 5, shown is another graphical illustration of a duty cycle enforcement technique in accordance with an embodiment of the present invention. In this example, assume the same defined power limit of 100 W, the same evaluation interval of 1 ms and a minimum hold time of 3 ms, leading to the same duty cycle of 25%. In the example of FIG. 5, note that power consumption increases with a larger excursion (e.g., reaching the $P_{max}$ maximum permitted excursion level of 160 W). As such, multiple reductions in frequency limit (and corresponding operating frequency reductions) occur to enable the processor to reduce its power consumption level back to the defined power limit. Thus the hold time is increased proportionately. Because here the duration of the power excursion above the defined power limit is longer, a longer hold time is shown in FIG. 5 to maintain enforcement of the same duty cycle. Although shown with these particular examples in the illustrations of FIGS. 4 and 5, understand that various other techniques to enforce a duty cycle of power consumption greater than a defined power limit may occur. Given the worst-case power excursion possible ($P_{max}$), it is possible to calculate the number of frequency steps to reduce the power down to the defined power limit, providing a worst-case excursion duration of $T_{max\_excursion}$=max_num_steps× Tp.

In an embodiment, the thermally sustainable power level may be for time periods of approximately 5-10 seconds, while an electrically sustainable power level may be for instantaneous time periods, e.g., microseconds. In an embodiment, this thermally sustainable power level may be at or substantially around a first power level (e.g., a PL1 level), while the electrically sustainable power level may be at or substantially around a second power level (e.g., a PL2 level).

Figure 6:
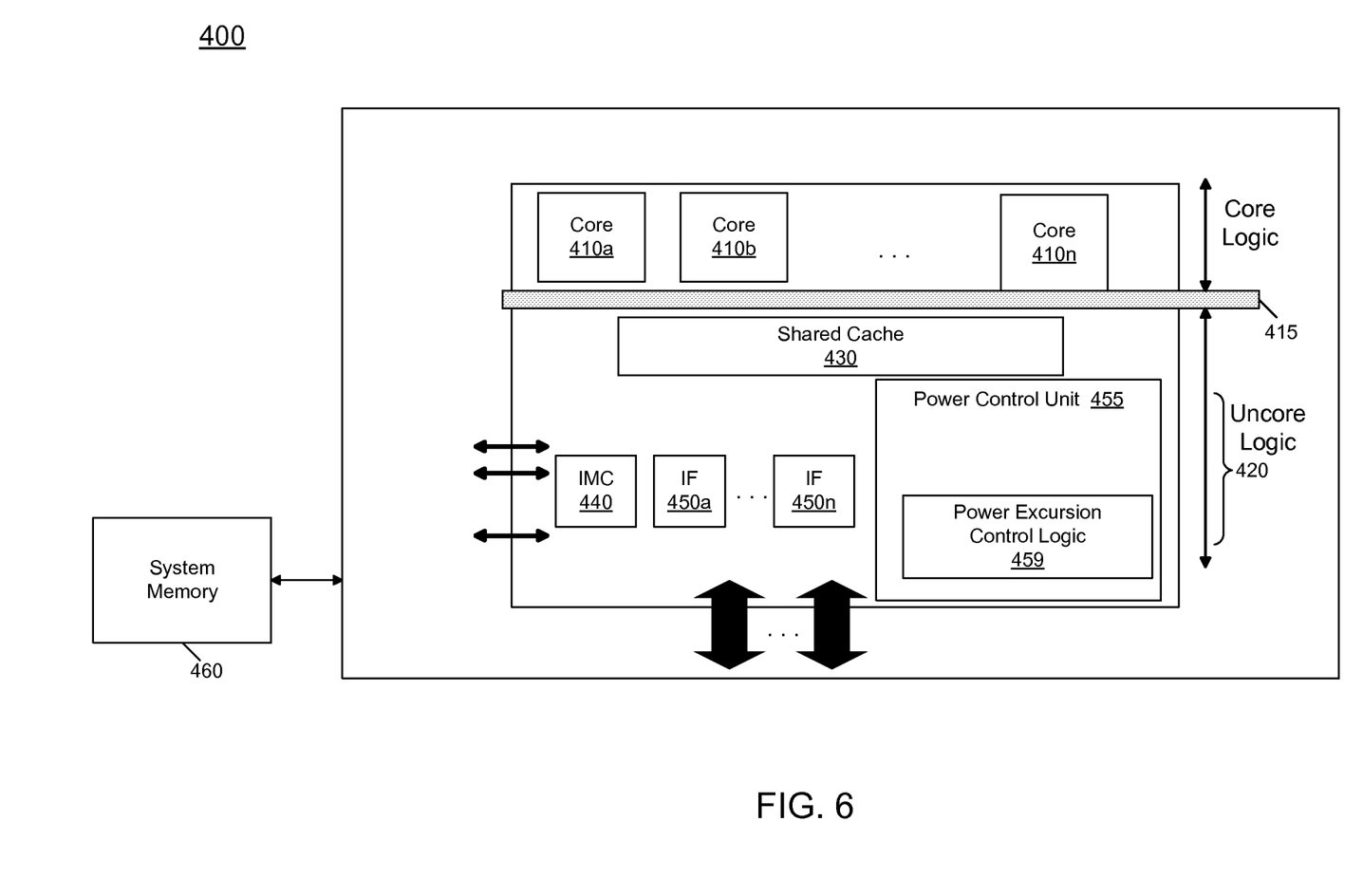
FIG. 6 is a block diagram of a processor in accordance with an embodiment of the present invention.

Embodiments can be implemented in processors for various markets including server processors, desktop processors, mobile processors and so forth. Referring now to FIG. 6, shown is a block diagram of a processor in accordance with an embodiment of the present invention. As shown in FIG. 6, processor 400 may be a multicore processor including a plurality of cores $410_a$-$410_n$. In one embodiment, each such core may be of an independent power domain and can be configured to enter and exit active states and/or maximum performance states based on workload. The various cores may be coupled via an interconnect 415 to a system agent or uncore 420 that includes various components. As seen, the uncore 420 may include a shared cache 430 which may be a last level cache. In addition, the uncore may include an integrated memory controller 440, various interfaces 450 and a power control unit 455.

In various embodiments, power control unit 455 may include a power excursion control logic 459 in accordance with an embodiment of the present invention. As described above, this logic can receive information regarding a power level at which the processor is operating and a frequency limit at which the processor is allowed to execute. Based on this information, when the power consumption exceeds a selected power level of one or more such levels, logic 459 can cause a reduction in power consumption in a particular manner, and enforce this reduction for a given duration and/or duty cycle. In this way, processor 400 can be configured to operate using a peak-rated power supply at close to its design value with very little guardband and without concern as to electrical failure.

With further reference to FIG. 6, processor 400 may communicate with a system memory 460, e.g., via a memory bus. In addition, by interfaces 450, connection can be made to various off-chip components such as peripheral devices, mass storage and so forth. While shown with this particular implementation in the embodiment of FIG. 6, the scope of the present invention is not limited in this regard.

Figure 7:
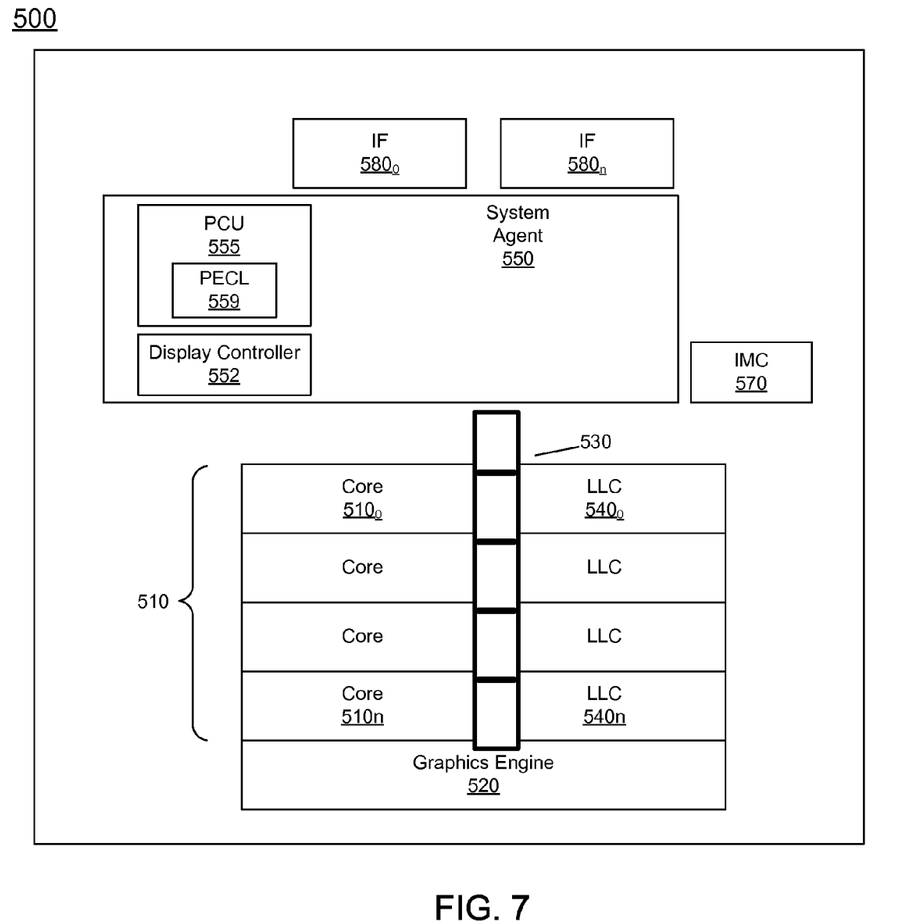
FIG. 7 is a block diagram of a multi-domain processor in accordance with another embodiment of the present invention.

Referring now to FIG. 7, shown is a block diagram of a multi-domain processor in accordance with another embodiment of the present invention. As shown in the embodiment of FIG. 7, processor 500 includes multiple domains. Specifically, a core domain 510 can include a plurality of cores $510_0$-$510_n$, a graphics domain 520 can include one or more graphics engines, and a system agent domain 550 may further be present. In some embodiments, system agent domain 550 may execute at an independent frequency than the core domain and may remain powered on at all times to handle power control events and power management such that domains 510 and 520 can be controlled to dynamically enter into and exit high power and low power states. Each of domains 510 and 520 may operate at different voltage and/or power. Note that while only shown with three domains, understand the scope of the present invention is not limited in this regard and additional domains can be present in other embodiments. For example, multiple core domains may be present each including at least one core.

In general, each core 510 may further include low level caches in addition to various execution units and additional processing elements. In turn, the various cores may be coupled to each other and to a shared cache memory formed of a plurality of units of a last level cache (LLC) $540_0$-$540_n$. In various embodiments, LLC 540 may be shared amongst the cores and the graphics engine, as well as various media processing circuitry. As seen, a ring interconnect 530 thus couples the cores together, and provides interconnection between the cores, graphics domain 520 and system agent circuitry 550. In one embodiment, interconnect 530 can be part of the core domain. However in other embodiments the ring interconnect can be of its own domain.

As further seen, system agent domain 550 may include display controller 552 which may provide control of and an interface to an associated display. As further seen, system agent domain 550 may include a power control unit 555 which can include a power excursion control logic 559 in accordance with an embodiment of the present invention to dynamically limit power consumption excursions of the processor to a maximum duration and/or duty cycle. In various embodiments, this logic may execute the algorithm described above in FIG. 2.

As further seen in FIG. 7, processor 500 can further include an integrated memory controller (IMC) 570 that can provide for an interface to a system memory, such as a dynamic random access memory (DRAM). Multiple interfaces $580_0$-$580_n$ may be present to enable interconnection between the processor and other circuitry. For example, in one embodiment at least one direct media interface (DMI) interface may be provided as well as one or more Peripheral Component Interconnect Express (PCI Express™ (PCIe™)) interfaces. Still further, to provide for communications between other agents such as additional processors or other circuitry, one or more interfaces in accordance with an Intel® Quick Path Interconnect (QPI) protocol may also be provided. Although shown at this high level in the embodiment of FIG. 7, understand the scope of the present invention is not limited in this regard.

Figure 8:
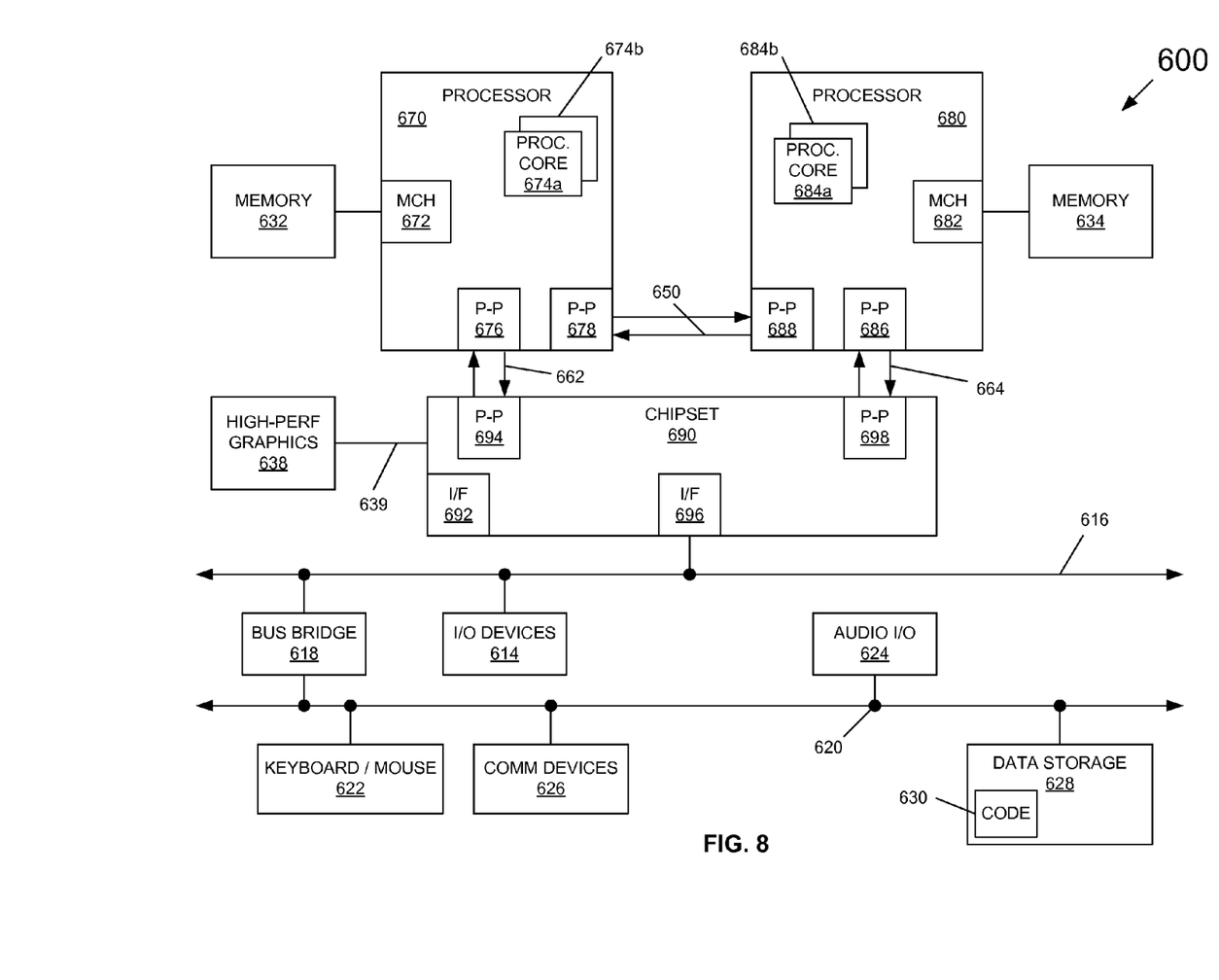
FIG. 8 is a block diagram of a system in accordance with an embodiment of the present invention.

Embodiments may be implemented in many different system types. Referring now to FIG. 8, shown is a block diagram of a system in accordance with an embodiment of the present invention. As shown in FIG. 8, multiprocessor system 600 is a point-to-point interconnect system, and includes a first processor 670 and a second processor 680 coupled via a point-to-point interconnect 650. As shown in FIG. 8, each of processors 670 and 680 may be multicore processors, including first and second processor cores (i.e., processor cores 674a and 674b and processor cores 684a and 684b), although potentially many more cores may be present in the processors. Each of the processors can include a PCU or other logic to perform power consumption limiting, and corresponding operating frequency and/or EDP control to guarantee power delivery system constraints are maintained, as described herein.

Still referring to FIG. 8, first processor 670 further includes a memory controller hub (MCH) 672 and point-to-point (P-P) interfaces 676 and 678. Similarly, second processor 680 includes a MCH 682 and P-P interfaces 686 and 688. As shown in FIG. 8, MCH's 672 and 682 couple the processors to respective memories, namely a memory 632 and a memory 634, which may be portions of system memory (e.g., DRAM) locally attached to the respective processors. First processor 670 and second processor 680 may be coupled to a chipset 690 via P-P interconnects 662 and 664, respectively. As shown in FIG. 8, chipset 690 includes P-P interfaces 694 and 698.

Furthermore, chipset 690 includes an interface 692 to couple chipset 690 with a high performance graphics engine 638, by a P-P interconnect 639. In turn, chipset 690 may be coupled to a first bus 616 via an interface 696. As shown in FIG. 8, various input/output (I/O) devices 614 may be coupled to first bus 616, along with a bus bridge 618 which couples first bus 616 to a second bus 620. Various devices may be coupled to second bus 620 including, for example, a keyboard/mouse 622, communication devices 626 and a data storage unit 628 such as a disk drive or other mass storage device which may include code 630, in one embodiment. Further, an audio I/O 624 may be coupled to second bus 620. Embodiments can be incorporated into other types of systems including mobile devices such as a smart cellular telephone, tablet computer, netbook, ultrabook, or so forth.

Embodiments thus provide an enforcement mechanism on power supply constraints to ensure that power supply components (e.g., a voltage regulator, power supply, battery and so forth) do not break down. As such, a duty cycle enforcement mechanism can be maintained so that excursions above a defined power limit are allowed for no more than this duty cycle period of time. These constraints are enforced using logic of a processor so that a guarantee exists to upstream power delivery components that a worst case scenario for such components are not exceeded.

Using an embodiment of the present invention, a processor can be guaranteed to enforce a duty cycle on all excursions above a given power limit. In this way, the processor may be used safely with peak-rated power supplies, which can support high electrical loads provided that they do not exceed a specified duty cycle. Accordingly, platform costs may be reduced as compared to designing a power supply that can sustain the maximum possible power for long periods of time. Embodiments also reduce the risk of under-designing the power supply and risking an electrical overload under rare corner-case conditions. Embodiments may also protect against a malicious attack that seeks to cause system harm by triggering a very high transient power consumption by execution of a synthetic workload (power virus). If a malicious high-power workload is run on a system including a processor with duty cycle control described herein, precise guarantees on duration and duty cycle are enforced to prevent extended operation at high power consumption levels.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
a plurality of cores each to independently execute instructions; and
a power control unit (PCU) coupled to the plurality of cores to control power consumption of the processor, the PCU including a control logic to limit a power consumption level of the processor from being above a defined power limit for more than a duty cycle portion of an operating period, and to limit the power consumption level from being above the defined power limit for more than an excursion duration, wherein the processor further comprises a first configuration storage to store a value of the excursion duration, a second configuration storage to store the defined power limit, and a third configuration storage to store a maximum excursion duration, the maximum excursion duration corresponding to a maximum duration for which the processor can operate at a maximum power excursion, wherein the control logic is to limit the power consumption level from being at the maximum power excursion for longer than the maximum excursion duration.

2. The processor of claim 1, wherein the control logic is to obtain the power consumption level from a power detector of the processor, and when the power consumption level is greater than the defined power level, to reduce a frequency limit at which the processor is to operate.

3. The processor of claim 2, wherein the frequency limit reduction is by a step value when the power consumption level is greater than the defined power limit and less than a second power limit and by a first value greater than the step value when the power consumption level is at the second power limit, the second power limit greater than the defined power limit.

4. The processor of claim 2, wherein the control logic is to further update a hold time for which the frequency limit is to be maintained, when the power consumption level is greater than the defined power limit.

5. The processor of claim 4, wherein the control logic is to increment the hold time when the power consumption level is greater than the defined power limit and to decrement the hold time during each evaluation interval.

6. The processor of claim 5, wherein the control logic is to increase the frequency limit after the hold time is completed.

7. The processor of claim 2, wherein the PCU is to prevent a software request for an increased performance level from being executed when an operating frequency for the increased performance level is greater than the frequency limit.

8. The processor of claim 1, wherein the defined power limit is to be settable by an original equipment manufacturer (OEM) of a system including the processor.

9. A method comprising:
   determining, in a power control unit (PCU) of a processor, whether a power consumption level of the processor is greater than a defined power limit for the processor;
   if so, enforcing a duty cycle so that the power consumption level exceeds the defined power limit for no more than the duty cycle; and
   limiting the power consumption level to prevent the processor from operation at a maximum power excursion for longer than a maximum excursion duration corresponding to a maximum duration during which the processor can operate at the maximum power excursion.

10. The method of claim 9, wherein enforcing the duty cycle comprises reducing a frequency limit to a first value if a number of consecutive determinations of the power consumption level greater than the defined power limit has occurred.

11. The method of claim 9, wherein enforcing the duty cycle comprises reducing a frequency limit by a step value.

12. The method of claim 9, further comprising adjusting a hold time by a minimum hold time value.

13. The method of claim 12, further comprising decrementing the hold time iteratively until the hold time is completed.

14. The method of claim 13, further comprising thereafter enabling the power consumption limit to exceed the defined power limit.

15. The method of claim 12, further comprising incrementing the hold time iteratively until the power consumption limit is less than the defined power limit.

16. A system comprising:
   a multicore processor comprising:
      a plurality of cores each to independently execute instructions;
      a plurality of graphics engines each to independently perform graphics operations;
      a power control unit (PCU) coupled to the plurality of cores to control power consumption of the multicore processor, the PCU including a control logic to allow a power consumption level of the multicore processor to be above a defined power limit for a portion of an operating period, the portion corresponding to a duty cycle value stored in a configuration storage of the multicore processor; and
      a storage to store a frequency limit value corresponding to a maximum allowed operating frequency for the multicore processor, to store a first excursion value corresponding to a first duration for which the multicore processor is allowed to be above the defined power limit, and to store a second excursion value corresponding to a second duration for which the multicore processor is allowed to be at a maximum power excursion above the defined power limit, the second excursion value less than the first excursion value;
   a power supply unit coupled to the multicore processor to provide a regulated voltage to the multicore processor; and
   a dynamic random access memory (DRAM) coupled to the multicore processor.

17. The system of claim 16, wherein the PCU is to prevent the multicore processor from operating at an operating frequency greater than the frequency limit value, wherein the control logic is to enforce the duty cycle value by reduction of the frequency limit value to a first value if a threshold number of consecutive determinations of the power consumption level greater than the defined power limit has occurred.

18. The system of claim 16, wherein the PCU is to prevent the power consumption level from exceeding the defined power limit for longer than the first excursion value, and to prevent the processor from operating at the maximum power excursion for longer than the second excursion value.

19. The system of claim 16, wherein the power supply unit comprises a battery to provide the regulated voltage to the multicore processor.

* * * * *